United States Patent
Zhou et al.

(10) Patent No.: US 10,353,666 B2
(45) Date of Patent: Jul. 16, 2019

(54) STARTING NETWORK-BASED SERVICES USING A VOCAL INTERFACE WITH COMMUNICATION SOFTWARE ON A MOBILE COMPUTING DEVICE

(71) Applicant: Alibaba Group Holding Limited, George Town (KY)

(72) Inventors: Jingwen Zhou, Hangzhou (CN); Qin Zhu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 15/701,210

(22) Filed: Sep. 11, 2017

(65) Prior Publication Data

US 2017/0371620 A1 Dec. 28, 2017

Related U.S. Application Data (63) Continuation of application No. PCT/CN2016/075377, filed on Mar. 2, 2016.

(30) Foreign Application Priority Data

Mar. 13, 2015 (CN) .......................... 2015 1 0111878

(51) Int. Cl.
*G06F 3/16* (2006.01)
*G10L 15/18* (2013.01)
(Continued)

(52) U.S. Cl.
CPC .............. *G06F 3/167* (2013.01); *G10L 15/22* (2013.01); *H04L 51/046* (2013.01); *H04L 51/10* (2013.01);
(Continued)

(58) Field of Classification Search
CPC ...... G06Q 20/06; G06Q 20/223; G06Q 20/22; G10L 17/22; G10L 25/48
See application file for complete search history.

(56) References Cited

U.S. PATENT DOCUMENTS 5,893,902 A * 4/1999 Transue ................. G06Q 20/04
704/270
8,117,036 B2 * 2/2012 Bedingfield, Sr. ...... G10L 15/22
704/255
(Continued)

FOREIGN PATENT DOCUMENTS

CN 1347332 5/2002
CN 1797452 7/2006
(Continued)

OTHER PUBLICATIONS

International Search Report of the International Searching Authority issued in International Application No. PCT/CN2016/075377 dated May 24, 2016; 8 pages.
(Continued)

*Primary Examiner* — Brian L Albertalli
(74) *Attorney, Agent, or Firm* — Fish & Richardson P.C.

(57) ABSTRACT

A method for starting network-based services using a vocal interface includes collecting voice information from a user and identifying network-based service information and transaction data. The network-based service information includes a voice command for starting one or more network-based services for the user. The transaction data includes one or more parties associated with a transaction and a transaction amount. The method further includes sending at least a portion of the voice information that includes the network-based service information and the transaction data to a server to process the one or more network-based services based on the service information and the transaction data.

18 Claims, 7 Drawing Sheets

(51) Int. Cl.
*G10L 15/22* (2006.01)
*H04L 12/58* (2006.01)
*G10L 15/30* (2013.01)

(52) U.S. Cl.
CPC .......... *H04L 51/18* (2013.01); *G10L 15/1822* (2013.01); *G10L 15/30* (2013.01); *G10L 2015/223* (2013.01)

(56) References Cited

U.S. PATENT DOCUMENTS

| | | | |
|---|---|---|---|
| 8,271,285 B2* | 9/2012 | Hansen | G06Q 20/341 |
| | | | 235/382 |
| 9,361,878 B2* | 6/2016 | Boukadakis | G06F 17/30283 |
| 9,448,698 B2* | 9/2016 | Patel | G06Q 20/32 |
| 9,626,703 B2* | 4/2017 | Kennewick, Sr. | |
| | | | G06Q 30/0601 |
| 9,818,115 B2* | 11/2017 | Tonini | G06Q 20/10 |
| 2007/0150286 A1 | 6/2007 | Miller et al. | |
| 2008/0095331 A1 | 4/2008 | Wasiuk | |
| 2008/0177661 A1* | 7/2008 | Mehra | G06Q 20/10 |
| | | | 705/44 |
| 2009/0313165 A1* | 12/2009 | Walter | G06F 21/35 |
| | | | 705/41 |
| 2010/0020946 A1 | 1/2010 | Jackson et al. | |
| 2010/0049619 A1 | 2/2010 | Beck | |
| 2013/0141516 A1* | 6/2013 | Baldwin | H04N 7/152 |
| | | | 348/E7.077 |
| 2013/0246066 A1 | 9/2013 | Choi | |
| 2015/0134330 A1* | 5/2015 | Baldwin | G06F 21/32 |
| | | | 704/232 |
| 2016/0012426 A1* | 1/2016 | Chitilian | G06Q 20/3674 |
| | | | 705/44 |

FOREIGN PATENT DOCUMENTS

| | | |
|---|---|---|
| CN | 1905598 | 1/2007 |
| CN | 101777101 A | 7/2010 |
| CN | 102917000 A | 2/2013 |
| CN | 103152244 A | 6/2013 |
| CN | 103929540 A | 7/2014 |
| CN | 104078043 | 10/2014 |
| JP | 2002279245 | 9/2002 |
| JP | 2004318731 | 11/2004 |
| KR | 10-2009-0039693 | 4/2009 |
| WO | WO 200062881 | 10/2000 |
| WO | WO 2014139117 | 9/2014 |
| WO | 2014173266 | 10/2014 |

OTHER PUBLICATIONS

Jurafsky et al.; "Hidden Markov Models" Speech and Language Processing; Chapter 9; Draft of Aug. 7, 2017; 21 pages.
Andrew Ng; "CS229 Lecture Notes, Part V Support Vector Machines"; 25 pages.
Douglas Reynolds; "Gaussian Mixture Models" MIT Lincoln Laboratory; 5 pages.
Search Report and Examination Report by the Intellectual Property Office of Singapore issued in Singapore Application No. 11201707417Y dated Jun. 29, 2018; 10 pages.
European Extended Search Report in European Application No. 16764173.7, dated Nov. 14, 2018, 8 pages.

* cited by examiner

STARTING NETWORK-BASED SERVICES USING A VOCAL INTERFACE WITH COMMUNICATION SOFTWARE ON A MOBILE COMPUTING DEVICE

This application is a continuation of PCT Application No. PCT/CN2016/075377, filed on Mar. 2, 2016, which claims priority to Chinese Application No. 201510111878.7, filed on Mar. 13, 2015, the entire contents of each which are hereby incorporated by reference.

TECHNICAL FIELD

The present disclosure relates to communications technology, and particularly, to starting network-based services using a vocal interface with communication software.

BACKGROUND

With the advent of the Internet and related technologies with respect to communication networks and systems, network-based services, such as payment and other types of services, have been developed in recent years to leverage speed, connectivity, and convenience that the Internet and other networks offer and are increasingly becoming a part of daily life. Examples of payment-type services can generally include mobile-device banking, ebanks, online lending, or other financial services. Payment-type services are increasingly used for a wide variety of modern financial transactions. For example, payment services can be used to make payments related to transportation, taxes, finances, education, bills, and security. Configuring automatic payments or automatic transfers of funds can, among other things, provide convenience for users, result in more consistent payments, and help to prevent assessment of late charges, interest, or penalties to users because of missed or late payments.

Instant messaging (IM) technologies provide a quick and efficient interactive communication platform for users, permitting real-time (or substantially real-time) exchange of information using the Internet. In some instances, users can implement payment services with Internet-implemented communication software (for example, IM applications). For example, some IM applications permit a payee to start a payment collection from a payer by establishing a payment request. To complete the transaction, the payee exits from an IM chat interface with the payer, clicks a button on a user interface to select a payment collection method, and then performs a series of actions according to a predetermined process.

SUMMARY

The present disclosure describes methods and systems, including computer-implemented methods, computer program products, and computer systems for starting network-based services using a vocal interface with communication software.

In an implementation, voice information from a user is collected. Network-based service information and transaction data are identified. The network-based service information includes a voice command for starting one or more network-based services for the user and the transaction data includes one or more parties associated with a transaction and a transaction amount. At least a portion of the voice information that includes the network-based service information and the transaction data are sent to a server to process the one or more network-based services based on the service information and the transaction data.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/instructions stored on the non-transitory, computer-readable medium.

The subject matter described in this specification can be implemented in particular implementations, so as to realize one or more of the following advantages. First, by permitting a network-based service (for example, a payment service) to be started using a vocal interface with communication software (for example, an Instant Messenger application) on a mobile computing or other computing device, the network-based service can be vocally-started by a user during the use of the communication software. Second, a voice-type interface can permit additional functions of a particular service to be accessed and performed without a need to exit from communication software interfaces or to perform complicated and awkward navigation or selection operations, thus minimizing operational complexity of the network-based service for a user and improving overall user experience. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DETAILED DESCRIPTION

The following detailed description describes methods and computing devices for starting network-based services using a vocal interface with communication software, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and as such details are within the skill of one of ordinary skill in the art. The present disclosure is not intended to be limited to the described or illustrated implementations, but to be accorded the widest scope consistent with the described principles and features.

The present disclosure describes starting a network-based service (or "service") using a vocal interface with communication software on a mobile computing or other computing device (a "user computing device"). In some implementations, a user can start the services during a communication session (such as, chatting or messaging) executing on a user computing device. The user can use the service without exiting the chat interface or communication session of the communication software to perform operations related to the service. By permitting a service (for example, a payment service) to be started using a vocal interface with communication software (for example, an Instant Messenger application) on a user computing device, the service can be vocally-started by a user during the use of the communication software. A voice-type interface can also allow additional functions of a particular service to be accessed and performed without a need to exit from communication software interfaces or to perform complicated and awkward navigation or selection operations, thus minimizing operational complexity of the service for a user and improving overall user experience.

Figure 1:
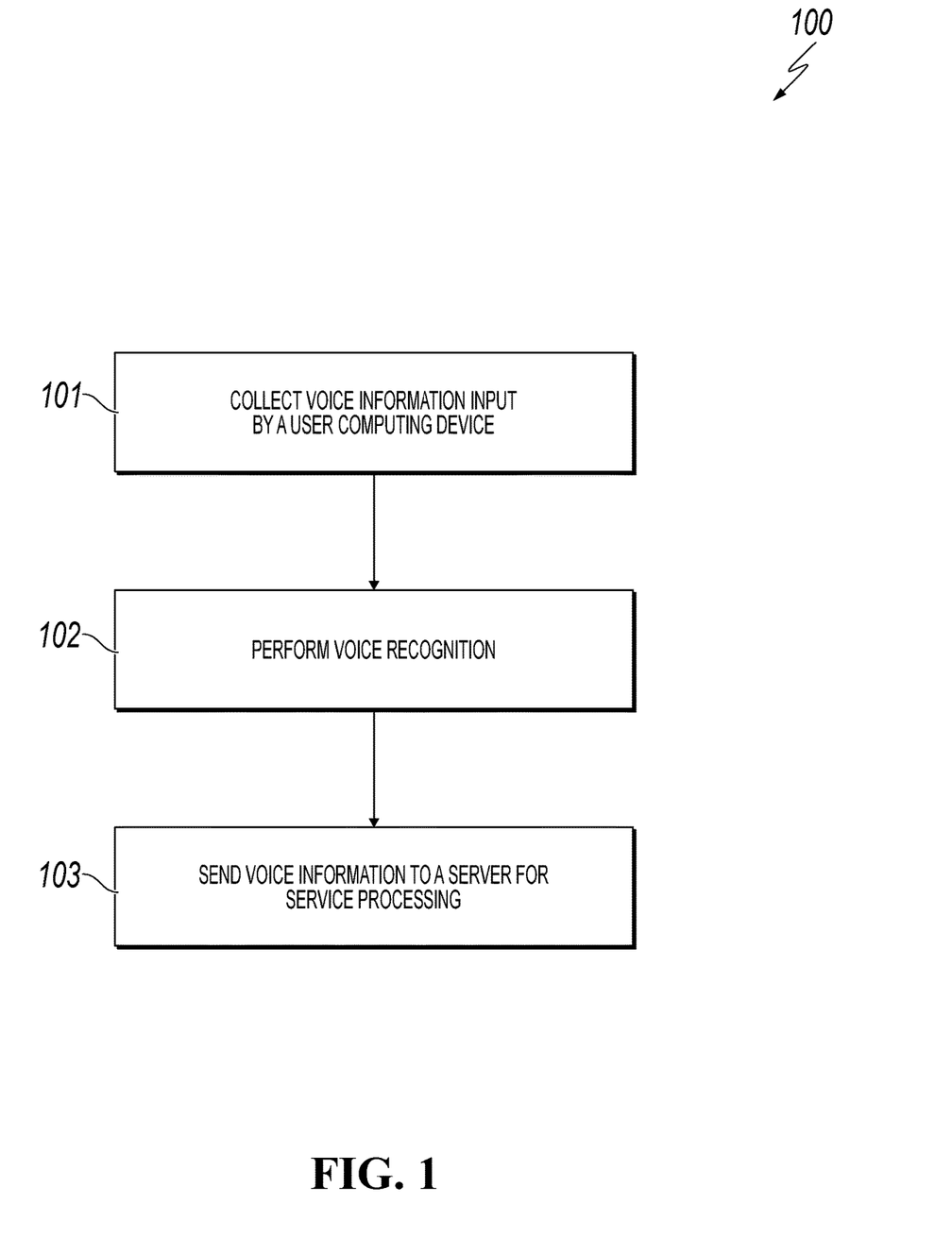
FIG. 1 is a flowchart illustrating an example of a method for starting a network-based service using a vocal interface with communication software, according to an implementation of the present disclosure.

FIG. 1 is a flowchart illustrating an example of a method 100 for starting a service using a vocal interface with communication software on a user computing device, according to an implementation of the present disclosure. For clarity of presentation, the description that follows generally describes method 100 in the context of the other figures in this description. However, it will be understood that method 100 may be performed, for example, by any suitable system, environment, software, and hardware, or a combination of systems, environments, software, and hardware, as appropriate. In some cases, various steps of method 100 can be run in parallel, in combination, in loops, or in any order.

In some cases, and for purposes of understanding, method 100 can be used in an instant messaging (IM) system for starting a service by voice, such as a payment service including sending, paying, transferring money, and other transactions. Example IM systems can include QQ, WECHAT, LAIWANG, IMESSAGE, and SNAPCHAT. The IM system can include user computing devices, servers, and communication software. A user computing device can include any computing device consistent with this disclosure, such as a mobile phone, a tablet, or a laptop computer. A server can include any server-type computer, such as an instant or real-time communication server, database server or other server. Users of the instant messaging system can use their user computing devices to register their accounts on the server to perform instant communications. Communication software can include any software or applications for inter-user communication such as QQ, WECHAT, LAIWANG, IMESSAGE, FACEBOOK, or SNAPCHAT. In some cases, method 100 can be performed by the user computing device, which can activate one or more corresponding services by collecting and recognizing voice information from the communication software user and send recognized service information to the server for processing.

At 101, the user computing device collects voice information input from a user who uses communication software to communicate with others. In some cases, method 100 further includes identity verification with respect to a user, that is, whether the user is a legal or authorized user of the communication software. In some cases, the identity verification can be performed during the process of starting the communication software but before collecting voice input. If a determination is made that the user is a legal or authorized user, the user is allowed to use the communication software; otherwise, the user can be denied access to the communication software or associated service functionality (for example, payment functionality). In some cases, the identity verification can be performed after the user starts voice input using the communication software. In such cases, the identity verification can be performed based on general user voice information (for example, general speech) or with a specific voice command (for example, the user stating "Start" or "Go"). In some cases, the identity verification can include identifying whether the user is authenticated or authorized to use at least one of the communications software for voice communications or specific voice commands such as the online payment command. It is to be understood that the identity verification methods disclosed in the present disclosure can be used separately or in any combination with respect to the communication software, services, or any aspect of the communication software or services.

In some cases, the identity verification can include verifying a user input operation or verifying a user biometric feature. Example input operations can include password input (for example, a character string input by the user), touch screen slide gesture, or pressing a combination of input keys (physical or virtual). Example biometric features can include user fingerprints, a face image, or a voiceprint. From 101, method 100 proceeds to 102.

At 102, the user computing device can perform voice information recognition. If the recognized voice information includes one or more specific voice commands for services, the user computing device can generate service information and start services in response to the voice commands. In some cases, the voice information input by the user can include transaction data. In such cases, recognizing the voice information can further include identifying information that includes the transaction data. From 102, method 100 proceeds to 103.

At 103, the user computing device can send voice information, including service information or information that includes transaction data (or a combination of service information and transaction data), to a server for processing the services. For example, the server can be any computer or server, such as an instant messaging server or a separate computer connected to the instant messaging server, that can process the services based on the service information. In some cases, the server can recognize the transaction data from the received information. Information that includes the transaction data sent to the server can be the voice information input by the user or a portion of it identified by the user computing device.

Figure 2:
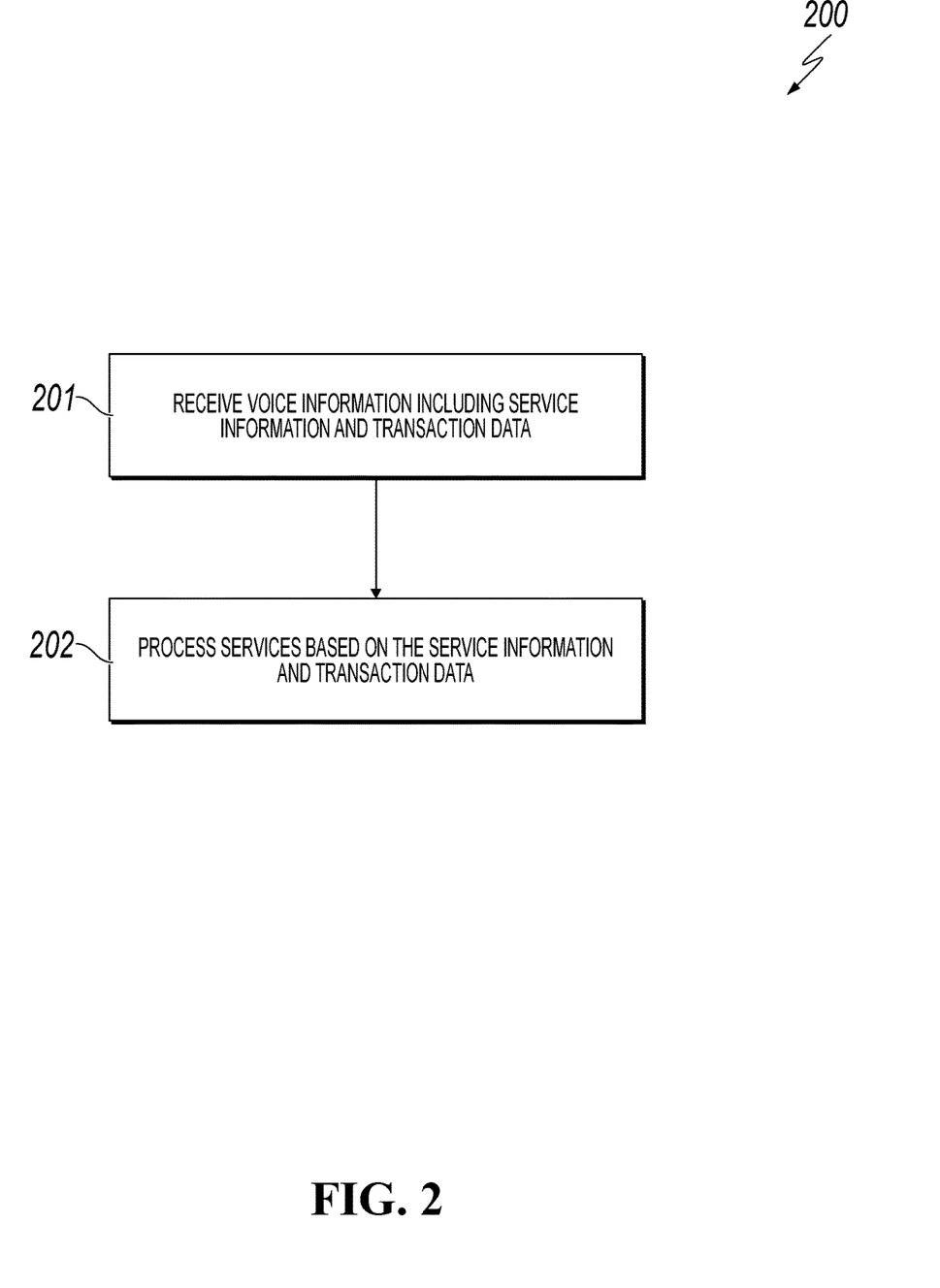
FIG. 2 is a flowchart illustrating an example of a method for starting a network-based service using a vocal interface communication software, according to an implementation of the present disclosure.

In some cases, after receiving the service information and the information that includes transaction data, the server can further generate order information, such as a business order or a purchase order, and return the order information to the user computing device. The business order can include service information and transaction data that is recognized by the user computing device or server based on the voice information. In some cases, the service information can include a service ID and user IDs for one or more users that are using the communication software. After 103, method 100 stops. After 103, method 100 stops FIG. 2 is a flowchart illustrating an example of a method 200 for starting a network-based service using a vocal interface communication software, according to an implementation of the present disclosure. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. In some cases, various steps of method 200 can be run in parallel, in combination, in loops, or in any order. In some cases, method 200 can be performed by a server, such as the server described in the description of method 100 in FIG. 1.

At 201, the server can receive service information and information that includes transaction data from the user computing device. In some cases, method 200 can further include recognizing the transaction data from the received information. In some cases, method 200 can further include verifying an identity of the user that sends the information for user authentication. The requested service can be declined if the user fails the authentication. In some cases, the user identity verification can be based on voiceprint recognition of the received information from the user computing device. From 201, method 200 proceeds to 202. From 201, method 200 proceeds to 202.

At 202, the server can process corresponding services based on the received service information and the recognized transaction data. In some cases, after receiving the service information and the information that includes transaction data, the server can further generate order information, such as a business order or a purchase order, and return the order information to the user computing device. The business order can include service information and transaction data that is recognized by the user computing device or server based on the voice information. In some cases, the service information can include a service ID and user IDs for one or more users that are using the communication software. Example services can include payment services such as sending, transferring, or paying money to another user. After 202, method 200 stops.

Figure 3:
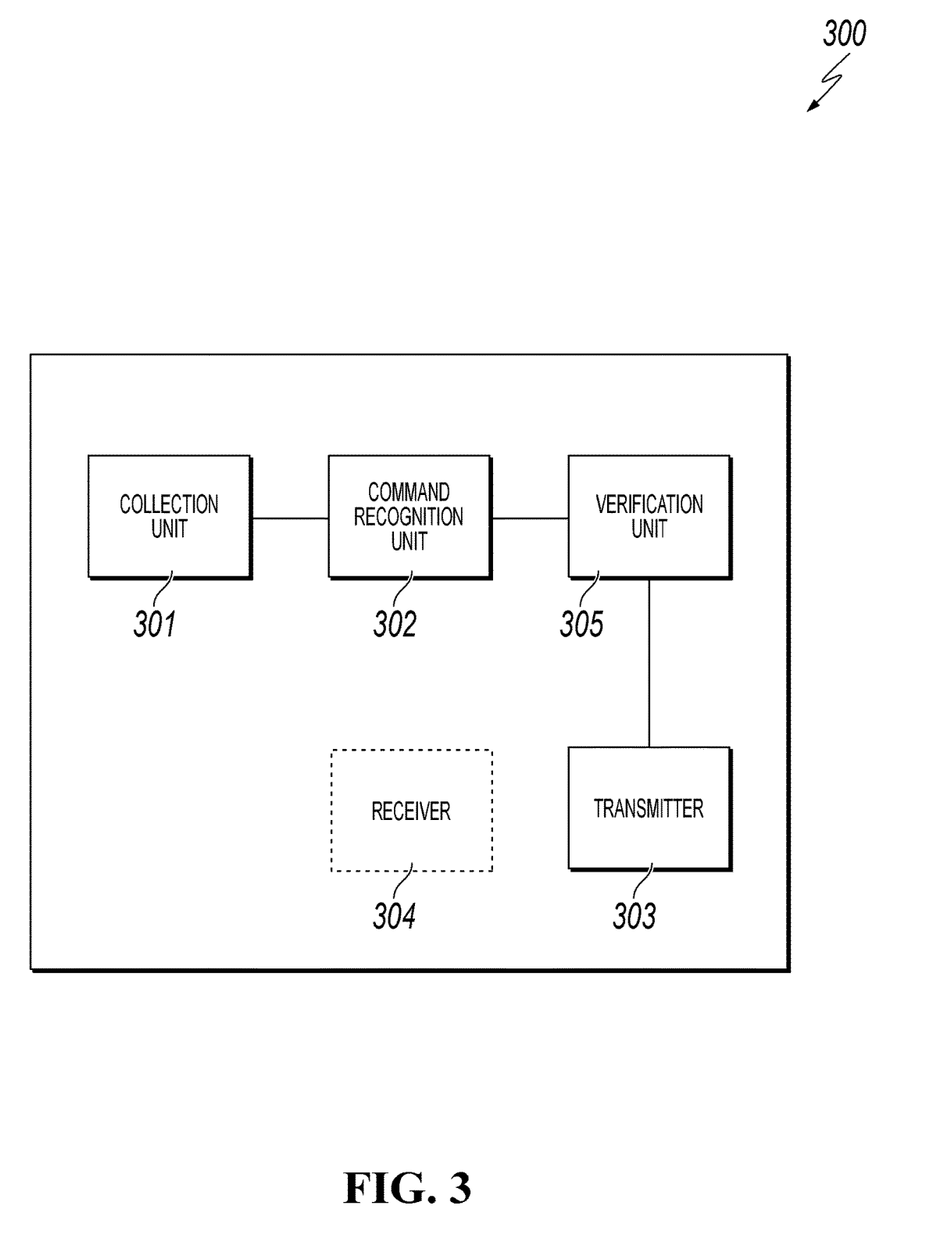
FIG. 3 is a block diagram illustrating an example of a computing device for starting a network-based service using a vocal interface communication software, according to an implementation of the present disclosure.

FIG. 3 is a block diagram illustrating an example of a computing device 300 for starting a network-based service using a vocal interface communication software, according to an implementation of the present disclosure. The example computing device can include a collection unit 301, a command recognition unit 302, a transmitter 303, a receiver 304, and a verification unit 305, which can be implemented in hardware, software, or both hardware and software.

The collection unit 301 can collect voice information input by the user when a user is communicating using the communication software, as discussed in step 101 of FIG. 1. The command recognition unit 302 can recognize the collected voice information, and activate corresponding services if it recognizes that the voice information includes a voice command, as discussed in step 102 of FIG. 1. The transmitter 303 can send corresponding service information and information that includes transaction data to a server, such that the server can process the service, as discussed in step 103 of FIG. 1. The receiver 304 can receive order information from the server, as discussed in step 103 of FIG. 1. The verification unit 305 can verify whether the user is a legal or authorized user, as discussed in step 101 of FIG. 1.

The transmitter 303 and receiver 304 can transmit and receive data by using Wi-Fi, a GPRS or a 3G or 4G network of the user computing device (for example, smartphone, tablet, computer, etc.) The collection unit 301 can be any voice input device such as a microphone integrated or communicably coupled to the user computing device. The command recognition unit 302 can be a voice recognition module or instructions for recognizing voice commands from voice information input stored in a non-transitory computer-readable storage medium coupled to at least one processor for execution by the at least one processor. The verification unit 305 can verify the identity of the user based on at least an input operation of the user, such as input through a virtual or physical keypad or key board, one or more sliding gestures on a touchscreen, fingerprint sensing through a fingerprint sensor, voiceprint recognition through microphone, or face recognition using a camera.

Figure 4:
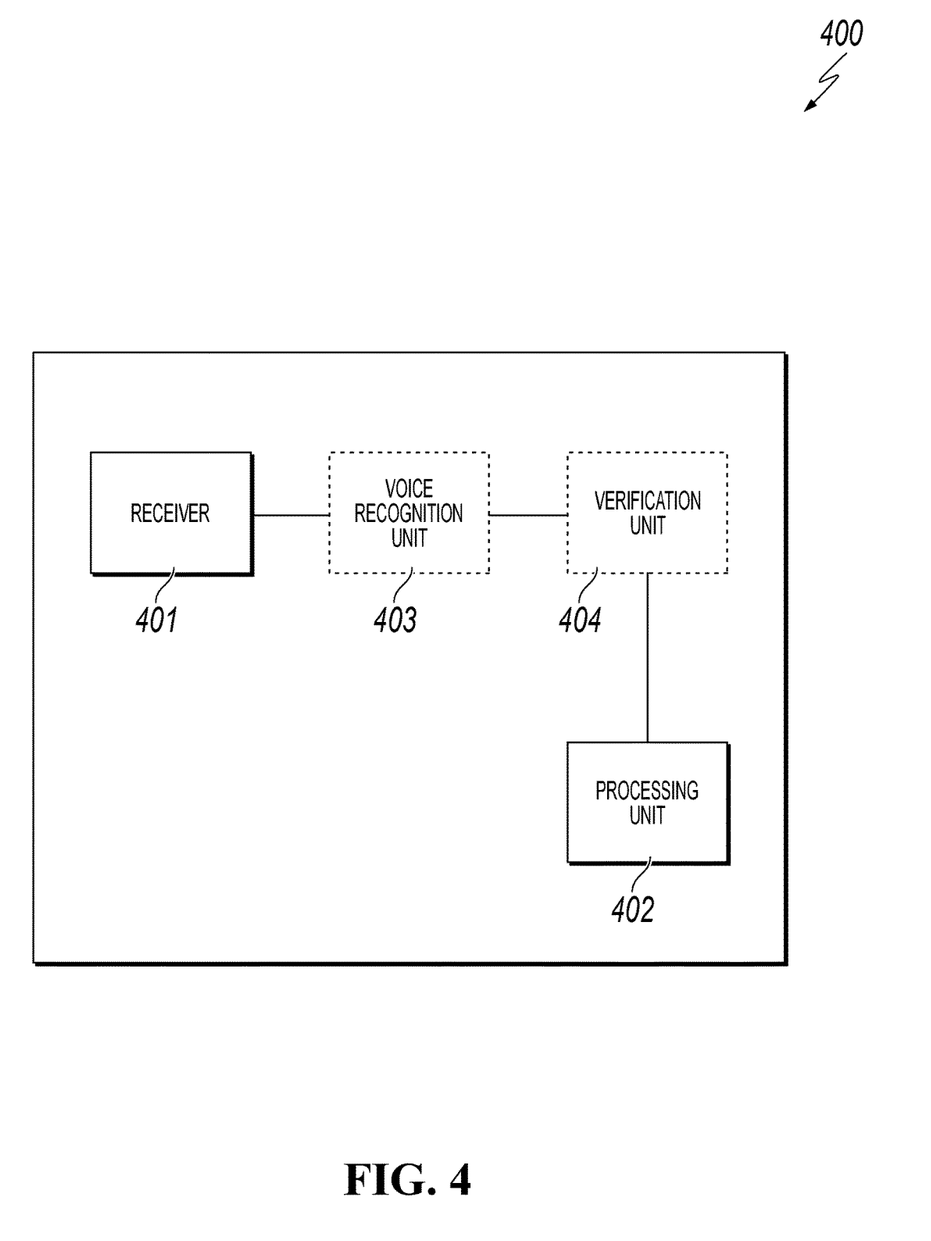
FIG. 4 is a block diagram illustrating an example of a computing device for a network-based service, according to an implementation of the present disclosure.

FIG. 4 is a block diagram illustrating an example of a computing device 400 for a network-based service, according to an implementation of the present disclosure. The example computing device 400 can be a server, such as the server described in the description of FIG. 1. The example computing device 400 can include a receiver 401, a processing unit 402, a voice recognition unit, and a verification unit 404, which can be implemented in hardware, software, or both.

The receiver 401 can receive service information and information that includes transaction data sent by the user computing device, as discussed in step 201 of FIG. 2. The processor 402 can process the corresponding services based on the received service information and the transaction data, as discussed in step 202 of FIG. 2. The voice recognition unit 403 can recognize the transaction data from the received voice information, such as the voice information or a portion of it, as discussed in step 201 of FIG. 2. The verification unit 404 can verify whether the user sending the information is a legal or authorized user, as discussed in step 201 of FIG. 2. In some cases, the verification unit 404 can be a voiceprint recognition sensor that can determine whether the user is a legal or authorized user by performing voiceprint recognition based on the received voice information.

The receiver 401 can be any communication module such as cellular, Wi-Fi, or Ethernet transceiver. The voice recognition unit 403 can include a microphone and the related voice recognition functions of the example computing device 400. In some cases, the verification unit 404 can perform user verification by comparing a received character string, biometric feature, fingerprint information, voice information, face information with corresponding pre-stored verification information for user identification. In some cases, the example computing device 400 can further include an order generation unit (not shown). The order generation unit can perform order information generation as described in step 201 of FIG. 2. In some implementations, the order generation unit can be implemented in a central processing unit, one or more digital signal processors, or a microcontroller.

Figure 5:
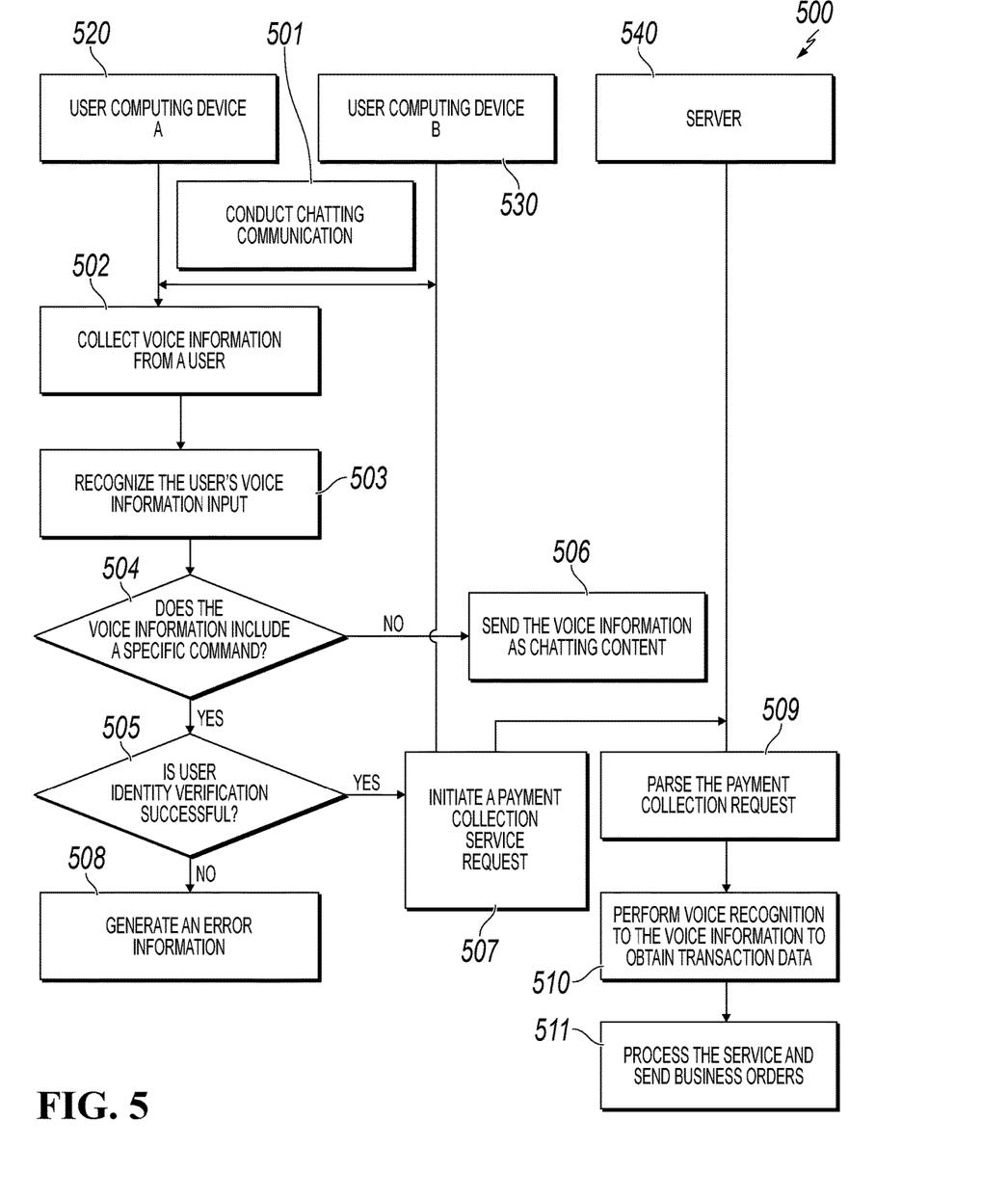
FIG. 5 is a flowchart illustrating an example of a process for starting a network-based service using a vocal interface communication software, according to an implementation of the present disclosure.

FIG. 5 is a flowchart illustrating an example of a method 500 for starting a network-based service using a vocal interface communication software, according to an implementation of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some cases, various steps of method 500 can be run in parallel, in combination, in loops, or in any order.

In the illustrated example, a user computing device A 520 and a user computing device B 530 can chat using communication software. A server 540 can be used to process services activated or started by user computing device A 520. User computing devices can include smartphones, tablets, computers, or any devices that can perform voice chatting. Communication software can be any software or application that can implement voice chatting, such as QQ, WECHAT, LAIWANG, FACEBOOK, SNAPCHAT, and IMESSAGE. In some cases, there can be more than two user computing devices, and the user computing device A 520 can start services to the server 540 when chatting with user computing devices in addition to user computing device B.

At 501, user computing device A 520 can start chatting with user computing device B 530 using communication software. The chats can include functions such as texting, voice chat, video chat, or any combinations of these or other chat functions. In some cases, the voice chat can be performed by sending short voice messages. From 501, method 500 proceeds to 502.

At 502, user computing device A 520 can collect (for example, through a microphone) voice information from a user. The voice information can include regular chat content and specific voice commands. For example, the user of user computing device A can input voice information "hello" through a microphone using the communication software and send it to the user computing device B 530. User computing device B 530 can reply with "hello" (regular chat content). The user of user computing device A can then dictate a voice command "awesome ALIPAY payment collection, I need to use this service to collect a $100 payment from you." The voice information includes a specific command "awesome ALIPAY payment collection" and transaction data "collect a $100 payment from you." From 501, method 500 proceeds to 502.

At 503, a command recognition unit of user computing device A 520 can recognize the user's voice information input. The command recognition unit can be a voice recognition module as described with respect to FIG. 3. From 503, method 500 proceeds to 504.

At 504, user computing device A 520 can determine whether the recognized voice information includes specific voice commands. If it is determined that the recognized voice information includes specific voice commands, method 500 continues to 505, where user computing device A 520 determines whether voiceprint verification of the user's voice information is successful. Otherwise, the voice information is sent to user computing device B 530 as normal chat message at 506. For example, the voice message "hello" does not include a specific voice command, method 500 proceeds to 506 where the voice message is sent to device B. The voice message "awesome ALIPAY payment collection, I need to use this service to collect $100 payment from you" includes the specific command "awesome ALIPAY payment collection." Method 500 then proceeds to 505 for voiceprint verification.

At 505, user computing device A 520 can determine whether voiceprint recognition for user identity verification based on the voice information is successful. If the voiceprint recognition is successful and the user's identity is verified, method 500 proceeds to 507; otherwise, method 500 proceeds to 508.

In some cases, the user can first perform voice training to develop a voiceprint model for improved voiceprint recognition accuracy. Example voiceprint models can include Hidden Markov Model (HMM), Gaussian Mixed Model (GMM), and Support Vector Machine (SVM). The voiceprint recognition can then be performed on the input voice information based on the voiceprint model. For example, the voice message "awesome ALIPAY payment collection" can be matched with a voiceprint model to verify whether the user is authorized to use the related service for account security. In some cases, the voiceprint information for voiceprint verification is only stored in the user computing device A 520nd is not uploaded to a server 540 to prevent personal identity leakage.

In some cases, security verification methods can be used other than voiceprint recognition, such as password input (for example, a character string input by the user), touch screen slide gesture, or pressing a combination of input keys (physical or virtual). Other biometric features can also be used such as fingerprint or a user's face characteristics.

In some cases, the voiceprint recognition or other security verification methods can be performed by a server 540. In such cases, a voiceprint sample database (or other corresponding data required for different verification methods) can be pre-stored in the server 540. When a service request is identified and sent for processing, voice information or other user data for verification is sent to the server 540 for user identity authentication.

In some cases, using voiceprint for user identity verification can be more efficient than other biometric or non-biometric methods, because the verification can be performed based on the user's voice input (including normal voice conversation, voice command, or the transaction data) without requiring additional authentication information such as password or fingerprint. This can allow more convenient and faster start of corresponding services when using the communication software for chatting and service activation.

User identity verification based on the aforementioned verification methods can be performed before, after, or at the time chatting starts at 501, depending on different implementations. In some cases, user identity verification can be performed before or at the time the user starts the communication software to ensure that the user is an authorized user. In some cases, the verification can be performed before the communication between user A and user B has started. For example, voiceprint recognition can be conducted based on a short regular voice message sent by a user using the communication software for user identity verification. In some cases, user identity verification such as voiceprint recognition can be conducted when a special voice command is recognized.

At 507, user computing device B 530 can start a payment collection service request to the server 540 after a voice command for the service is recognized at 504 and the user has passed the voiceprint verification at 505. The payment collection service request can include service information and voice information. For example, the service information can include a service ID (for example, an identifier associated with the payment collection service) and user-specific IDs (for example, identifiers specific to user computing device A 520, user computing device B 530, SIM cards of the devices, etc.) associated with the users that are in communications. The voice information can be the message "awesome ALIPAY payment collection, I need to use this service to collect a $100 payment from you," which includes transaction data "collect a $100 payment from you." From 507, method 500 proceeds to 509.

At 508, user computing device A 520 can generate an error information to the user and decline to start the requested service if the user fails to pass the identity verification at 505.

At 509, the server 540 can parse the payment collection service request sent by user computing device A 520 to obtain the included service information and voice information such as the information described at 507. From 509, method 500 proceeds to 510.

At 510, the server 540 can perform voice recognition to the voice information to obtain transaction data. In some cases, this step can be performed by a voice recognition unit as described in the description of FIG. 4. The transaction data can include all information related to the transaction such as the parties of the transaction amount. For example, if the recognized transaction data is "collect $100 payment from you." The server 540 can perform semantic analysis of the service information and voice information to determine that the payee is user computing device A 520, and the payer is user computing device B 530, and the transaction amount is $100. Typically, the server 540 will have higher processing power than the user computing devices and can be used to perform more sophisticated voice recognition functions and to provide more accurate recognition and parsing of transaction data. From 510, method 500 proceeds to 511.

At 511, the server 540 can process the service started by user computing device A 520 and generate/send business orders to user computing device A 520 and user computing device B 530. The service can be processed based on the service information and transaction data. In some cases, the business order sent to user computing device A 520 can be an order notification. The business order sent to user computing device B 530 can be a request for payment. User computing device B 530 can then perform payment operations accordingly. After 511, method 500 ends.

Figure 6:
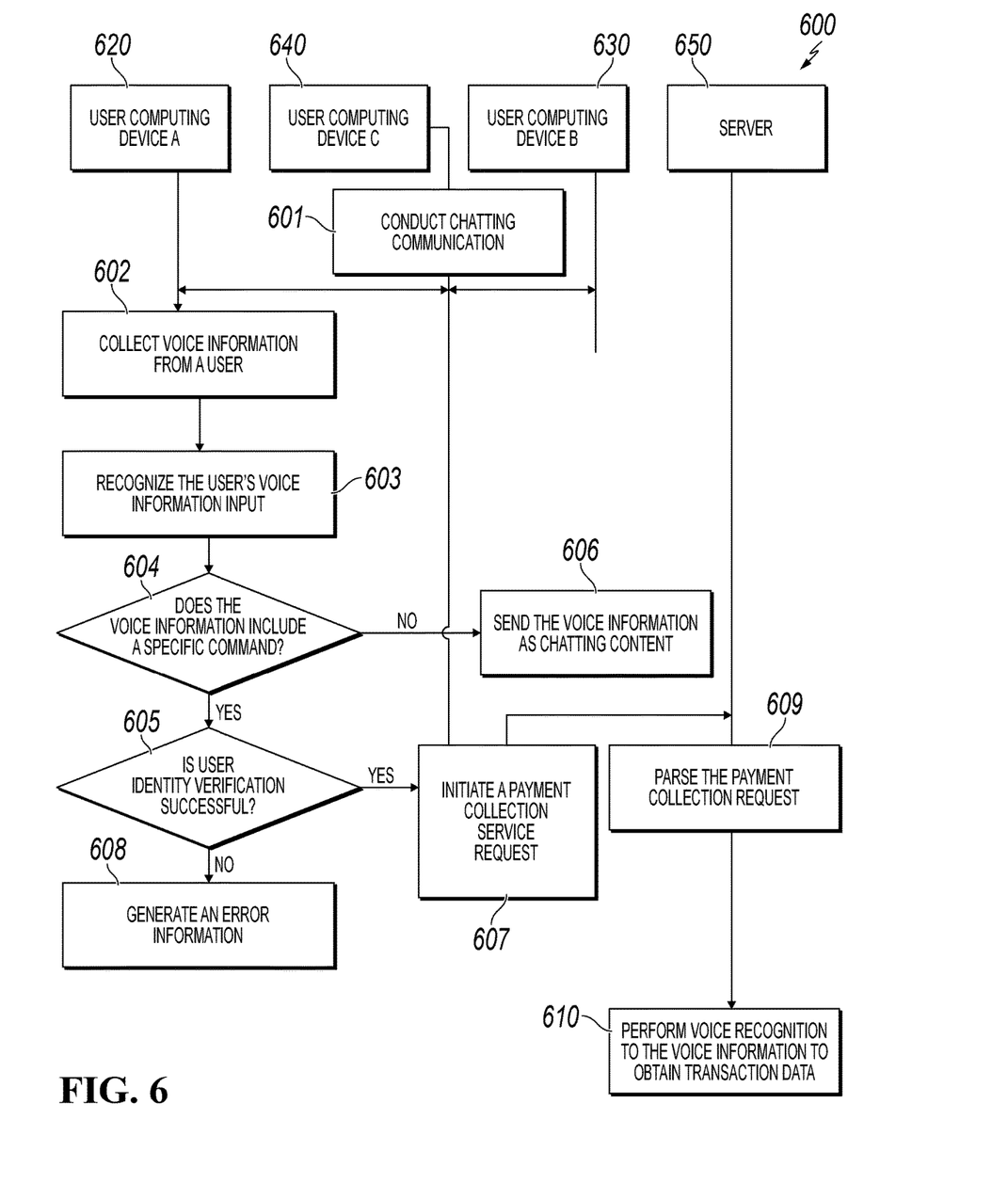
FIG. 6 is a flowchart illustrating another example of a process for starting a network-based service using a vocal interface communication software, according to an implementation of the present disclosure.

FIG. 6 is a flowchart illustrating another example of a method 600 for starting a network-based service using a vocal interface communication software, according to an implementation of the present disclosure. For clarity of presentation, the description that follows generally describes method 600 in the context of the other figures in this description. However, it will be understood that method 600 can be performed, for example, by any suitable system, environment, software, and hardware, or a combination of systems, environments, software, and hardware, as appropriate. In some cases, various steps of method 600 can be run in parallel, in combination, in loops, or in any order.

In the illustrated example, user computing device A 620, user computing device B 630, and user computing device C 640 can chat using communication software. A server 650 can be used to process services activated or started by user computing device A 620.

At 601, user computing device A 620 can start chatting with user computing device B 630 or user computing device C 640 using the communication software. The chats can include texting, voice chat, video chat, or any combinations thereof. In some cases, the voice chat can be performed by sending short voice messages. From 601, method 600 proceeds to 602.

At 602, user computing device A 620 can collect, through a microphone, voice information input by the user. User computing device A 620 can collect, through a microphone, voice information from a user. For example, the voice information can be "awesome ALIPAY payment collection, I need to use this service to collect $100 payment from you" as described in step 502 of FIG. 5. From 602, method 600 proceeds to 603.

At 603, a command recognition unit of user computing device A 620 can recognize the user's voice information input, including both specific voice command and transaction data. The command recognition unit can be a voice recognition module as described in the description of FIG. 3. For example, a user can input voice information "ALIPAY payment, I want to pay user computing device C 640 $100." The command recognition unit can recognize the voice command "ALIPAY payment" and transaction data "I want to pay user computing device C 640 $100." In this example, after semantic analysis and resolving user identifiers, the transaction data for service processing can include: the payer is user computing device A 620, the payee is user computing device C 640, and the transaction amount is $100. From 603, method 600 proceeds to 604.

At 604, user computing device A 620 can determine whether the recognized voice information includes specific voice commands. If yes, method 600 continues to 605, where user computing device A 620 determines whether voiceprint verification of the user's voice information is successful. Otherwise, the voice information is sent to user computing device B 630 as normal chat message at 606.

At 605, user computing device A 620 can perform voiceprint recognition for user identity verification based on the voice information. The voice recognition can be performed based on methods as described in step 505 of FIG. 5. If the voiceprint recognition is successful and the user's identity is verified, method 600 proceeds to 607; otherwise, method 600 proceeds to 608.

In some cases, user identity verification can be conducted the server 650. In such cases, user data for identity verification can be sent to the server 650.

At 607, user computing device C 640 can start a payment service request to the server 650 after a voice command for the service is recognized at 604 and the user has passed the voiceprint verification at 605. The payment service request can include service information and voice information. For example, the service information can include a service ID (for example, an identifier associated with the payment collection service) and user-specific IDs (for example, identifiers specific to user computing device A 620, user computing device B 630, SIM cards of the devices, etc.) associated with the users that are in communications. The voice information can be the message "ALIPAY payment, I want to pay user computing device C 640 $100." The transaction data include: the payer is the user computing device A 620, the payee is the user computing device C 640, and the transaction amount is $100. From 607, method 600 proceeds to 609.

At 608, user computing device A 620 can generate an error information to the user and decline to start the requested service if the user fails to pass the identity verification at 605.

At 609, the server 650 can parse the payment collection service request sent by user computing device A 620 to obtain the included service information and voice information such as the information described at 607. The payment service request can include service information and voice information. For example, the service information can include a service ID (for example, an identifier associated with the payment collection service) and user-specific IDs (for example, identifiers specific to user computing device A 620, user computing device B 630, user computing device C 640, SIM cards of the devices, etc.) associated with the users that are in communications. The voice information can be the message "ALIPAY payment, I want to pay user computing device C 640 $100," which includes transaction data "pay user computing device C 640 $100." From 609, method 600 proceeds to 610.

At 610, the server 650 can process the service started by user computing device A 620 and generate and send business orders to user computing device A 620 and user computing device C 640. The service can be processed based on the service information and transaction data. In some cases, the business order sent to user computing device A 620 can be an order notification. The business order sent to user computing device C 640 can be a request for payment. User computing device C 640 can then perform payment operations accordingly. After 610, method 600 ends.

The business order is generated according to the business ID and the users involved in the business and according to the transaction data. The business order is sent to both parties of this payment business. The business order sent to the user computing device A 620 is a payment request, and the user computing device A 620 can perform a payment operation according to a business process in the prior art. The business order sent to the user computing device C 640 is a collection notification.

Figure 7:
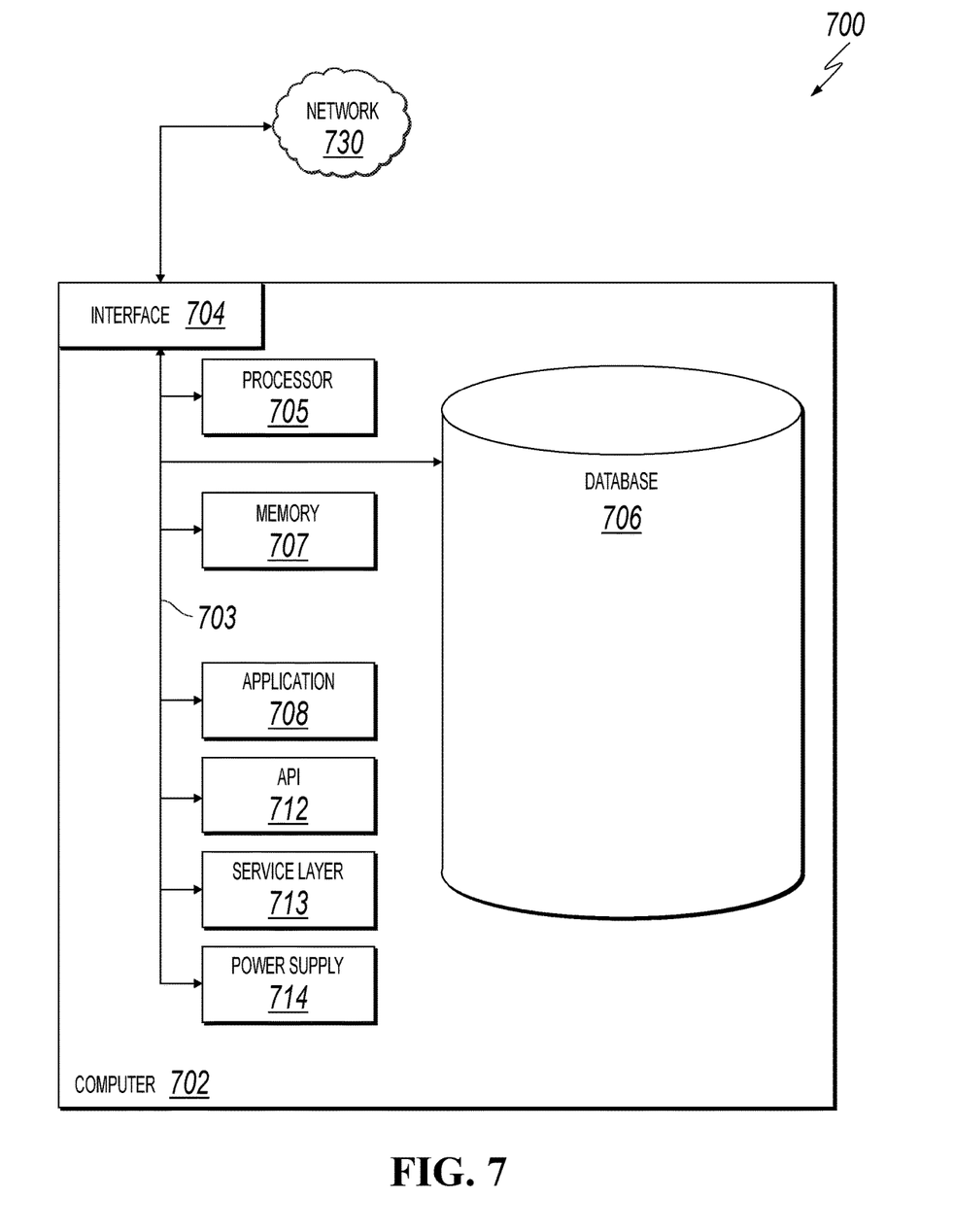
FIG. 7 is a block diagram illustrating an example of a computer system used to provide computational functionalities associated with described algorithms, methods, functions, processes, flows, and procedures as described in the instant disclosure, according to an implementation of the present disclosure.

FIG. 7 is a block diagram illustrating an example of a computer system 700 used to provide computational functionalities associated with described algorithms, methods, functions, processes, flows, and procedures, as described in the instant disclosure, according to an implementation. The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a graphical user interface (GUI).

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some cases, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, or other server (or a combination of servers).

The computer 702 can receive requests over network 730 from a client application (for example, executing on another computer 702) and respond to the received requests by processing the received requests using an appropriate software application(s). In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some cases, any or all of the components of the computer 702, hardware or software (or a combination of both hardware and software), may interface with each other or the interface 704 (or a combination of both), over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of this disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems that are connected to the network 730 (whether illustrated or not) in a distributed environment. Generally, the interface 704 comprises logic encoded in software or hardware (or a combination of software and hardware) and is operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a database 706 that can hold data for the computer 702 or other components (or a combination of both) that can be connected to the network 730 (whether illustrated or not). For example, database 706 can be an in-memory, conventional, or other type of database storing data consistent with this disclosure. In some cases, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases (of the same or combination of types) can be used according to particular needs, desires, or particular implementations of the computer 702 and the described functionality. While database 706 is illustrated as an integral component of the computer 702, in alternative implementations, database 706 can be external to the computer 702.

The computer 702 also includes a memory 707 that can hold data for the computer 702 or other components (or a combination of both) that can be connected to the network 730 (whether illustrated or not). Memory 707 can store any data consistent with this disclosure. In some cases, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same or combination of types) can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in this disclosure. For example, application 708 can serve as one or more components, modules, or applications. Further, although illustrated as a single application 708, the application 708 may be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some cases, the power supply 714 can include power-conversion or management circuits (including recharging, standby, or other power management functionality). In some cases, the power supply 714 can include a power plug to allow the computer 702 to be plugged into a wall socket or other power source to, for example, power the computer 702 or recharge a rechargeable battery.

There may be any number of computers 702 associated with, or external to, a computer system containing computer 702, each computer 702 communicating over network 730. Further, the term "client," "user," and other appropriate terminology may be used interchangeably, as appropriate, without departing from the scope of this disclosure. Moreover, this disclosure contemplates that many users may use one computer 702, or that one user may use multiple computers 702.

Described implementations of the subject matter can include one or more features, alone or in combination.

For example, in a first implementation, a computer-implemented method, comprises, collecting voice information from a user; identifying network-based service information and transaction data, wherein the network-based service information includes a voice command for starting one or more network-based services for the user and the transaction data includes one or more parties associated with a transaction and a transaction amount; and sending at least a portion of the voice information that includes the network-based service information and the transaction data to a server to process the one or more network-based services based on the service information and the transaction data.

The foregoing and other described implementations can each, optionally, include one or more of the following features:

A first feature, combinable with any of the following features, comprises verifying whether the user is authorized to use the one or more network-based services.

A second feature, combinable with any of the previous or following features, wherein verifying whether the user is an authorized user is based on a user input operation or a user biometric feature.

A third feature, combinable with any of the previous or following features, wherein verifying whether the user is an authorized user is based on recognizing a user voiceprint and authorizing the user for starting the one or more network-based services when the user voiceprint matches a pre-stored voiceprint.

A fourth feature, combinable with any of the previous or following features, wherein the service information further includes one or more service identifications (IDs) associated with the one or more network-based services and one or more user IDs or user computing device IDs associated with one or more users or user computing devices that use the communication software for starting the one or more network-based services.

A fifth feature, combinable with any of the previous or following features, comprises receiving a business order associated with one or more operations of completing the service from the server.

In a second implementation, a non-transitory, computer-readable medium storing one or more instructions executable by a computer system to perform operations comprises collecting voice information from a user; identifying network-based service information and transaction data, wherein the network-based service information includes a voice command for starting one or more network-based services for the user and the transaction data includes one or more parties associated with a transaction and a transaction amount; and sending at least a portion of the voice information that includes the network-based service information and the transaction data to a server to process the one or more network-based services based on the service information and the transaction data.

The foregoing and other described implementations can each, optionally, include one or more of the following features:

A first feature, combinable with any of the following features, comprises verifying whether the user is authorized to use the one or more network-based services.

A second feature, combinable with any of the previous or following features, wherein verifying whether the user is an authorized user is based on a user input operation or a user biometric feature.

A third feature, combinable with any of the previous or following features, wherein verifying whether the user is an authorized user is based on recognizing a user voiceprint and authorizing the user for starting the one or more network-based services when the user voiceprint matches a pre-stored voiceprint.

A fourth feature, combinable with any of the previous or following features, wherein the service information further includes one or more service identifications (IDs) associated with the one or more network-based services and one or more user IDs or user computing device IDs associated with one or more users or user computing devices that use the communication software for starting the one or more network-based services.

A fifth feature, combinable with any of the previous or following features, comprises receiving a business order associated with one or more operations of completing the service from the server.

In a third implementation, A computer-implemented system, comprises one or more computers; and one or more computer memory devices interoperably coupled with the one or more computers and having tangible, non-transitory, machine-readable media storing instructions that, when executed by the one or more computers, perform operations comprises collecting voice information from a user; identifying network-based service information and transaction data, wherein the network-based service information includes a voice command for starting one or more network-based services for the user and the transaction data includes one or more parties associated with a transaction and a transaction amount; and sending at least a portion of the voice information that includes the network-based service information and the transaction data to a server to process the one or more network-based services based on the service information and the transaction data.

The foregoing and other described implementations can each, optionally, include one or more of the following features:

A first feature, comprises verifying whether the user is authorized to use the one or more network-based services.

A second feature, combinable with any of the previous or following features, wherein verifying whether the user is an authorized user is based on a user input operation or a user biometric feature.

A third feature, combinable with any of the previous or following features, wherein verifying whether the user is an authorized user is based on recognizing a user voiceprint and authorizing the user for starting the one or more network-based services when the user voiceprint matches a pre-stored voiceprint.

A fourth feature, combinable with any of the previous or following features, wherein the service information further includes one or more service identifications (IDs) associated with the one or more network-based services and one or more user IDs or user computing device IDs associated with one or more users or user computing devices that use the communication software for starting the one or more network-based services.

A fifth feature, combinable with any of the previous or following features, comprises receiving a business order associated with one or more operations of completing the service from the server.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or started for display) instantaneously, it is displayed (or started for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The computing device can also be, or further include special purpose logic circuitry, for example, a central processing unit (CPU), an FPGA (field programmable gate array), or an ASIC (application-specific integrated circuit). In some cases, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   collecting, by a computing device, voice information from a user during communication with one or more parties;
   determining, by the computing device, whether the voice information includes a specific voice command associated with a payment collection request;
   based upon the determining whether the voice information includes the specific voice command, forwarding, by the computing device, the voice information to the one or more parties or preventing forwarding, by the computing device, the specific voice command to the one or more parties;
   upon preventing forwarding of the specific voice command to the one or more parties, verifying an identity of the user by voiceprint verification of the voice information from the user;
   upon successful verification of the identity of the user, identifying, by the computing device from the specific voice command, network-based service information and transaction data, wherein the network-based service information includes a command for starting one or more network-based services for the user and the transaction data includes the one or more parties associated with a transaction and a transaction amount;
   sending, by the computing device, at least a portion of the voice information that includes the network-based service information and the transaction data to a server to process the one or more network-based services based on the service information and the transaction data; and
   receiving, by the computing device from the server, an order notification associated with the payment collection request.

2. The computer-implemented method of claim 1, further comprising verifying whether the user is authorized to use the one or more network-based services.

3. The computer-implemented method of claim 2, wherein verifying whether the user is an authorized user is based on a user input operation or a user biometric feature.

4. The computer-implemented method of claim 3, wherein verifying whether the user is an authorized user is based on recognizing a user voiceprint and authorizing the user for starting the one or more network-based services when the user voiceprint matches a pre-stored voiceprint.

5. The computer-implemented method of claim 1, wherein the service information further includes one or more service identifications (IDs) associated with the one or more network-based services and one or more user IDs or user computing device IDs associated with one or more users or user computing devices that use the communication software for starting the one or more network-based services.

6. The computer-implemented method of claim 1, further comprising receiving a business order associated with one or more operations of completing the service from the server.

7. A non-transitory, computer-readable medium storing one or more instructions executable by a computer system to perform operations comprising:
   collecting, by a computing device, voice information from a user during communication with one or more parties;
   determining, by the computing device, whether the voice information includes a specific voice command associated with a payment collection request;
   based upon the determining whether the voice information includes the specific voice command, forwarding, by the computing device, the voice information to the one or more parties or preventing forwarding, by the computing device, the specific voice command to the one or more parties;

upon preventing forwarding of the specific voice command to the one or more parties, verifying an identity of the user by voiceprint verification of the voice information from the user;

upon successful verification of the identity of the user, identifying, by the computing device from the specific voice command, network-based service information and transaction data, wherein the network-based service information includes a command for starting one or more network-based services for the user and the transaction data includes the one or more parties associated with a transaction and a transaction amount;

sending, by the computing device, at least a portion of the voice information that includes the network-based service information and the transaction data to a server to process the one or more network-based services based on the service information and the transaction data; and receiving, by the computing device from the server, an order notification associated with the payment collection request.

8. The non-transitory, computer-readable medium of claim 7, further comprising verifying whether the user is authorized to use the one or more network-based services.

9. The non-transitory, computer-readable medium of claim 8, wherein verifying whether the user is an authorized user is based on a user input operation or a user biometric feature.

10. The non-transitory, computer-readable medium of claim 9, wherein verifying whether the user is an authorized user is based on recognizing a user voiceprint and authorizing the user for starting the one or more network-based services when the user voiceprint matches a pre-stored voiceprint.

11. The non-transitory, computer-readable medium of claim 7, wherein the service information further includes one or more service identifications (IDs) associated with the one or more network-based services and one or more user IDs or user computing device IDs associated with one or more users or user computing devices that use the communication software for starting the one or more network-based services.

12. The non-transitory, computer-readable medium of claim 7, further comprising receiving a business order associated with one or more operations of completing the service from the server.

13. A computer-implemented system, comprising:
one or more computers; and
one or more computer memory devices interoperably coupled with the one or more computers and having tangible, non-transitory, machine-readable media storing instructions that, when executed by the one or more computers, perform operations comprising:

collecting, by a computing device, voice information from a user during communication with one or more parties;

determining, by the computing device, whether the voice information includes a specific voice command associated with a payment collection request;

based upon the determining whether the voice information includes the specific voice command, forwarding, by the computing device, the voice information to the one or more parties or preventing forwarding, by the computing device, the specific voice command to the one or more parties;

upon preventing forwarding of the specific voice command to the one or more parties, verifying an identity of the user by voiceprint verification of the voice information from the user;

upon successful verification of the identity of the user, identifying, by the computing device from the specific voice command, network-based service information and transaction data, wherein the network-based service information includes a command for starting one or more network-based services for the user and the transaction data includes the one or more parties associated with a transaction and a transaction amount;

sending, by the computing device, at least a portion of the voice information that includes the network-based service information and the transaction data to a server to process the one or more network-based services based on the service information and the transaction data; and receiving, by the computing device from the server, an order notification associated with the payment collection request.

14. The computer-implemented system of claim 13, further comprising verifying whether the user is authorized to use the one or more network-based services.

15. The computer-implemented system of claim 14, wherein verifying whether the user is an authorized user is based on a user input operation or a user biometric feature.

16. The computer-implemented system of claim 15, wherein verifying whether the user is an authorized user is based on recognizing a user voiceprint and authorizing the user for starting the one or more network-based services when the user voiceprint matches a pre-stored voiceprint.

17. The computer-implemented system of claim 13, wherein the service information further includes one or more service identifications (IDs) associated with the one or more network-based services and one or more user IDs or user computing device IDs associated with one or more users or user computing devices that use the communication software for starting the one or more network-based services.

18. The computer-implemented system of claim 13, further comprising receiving a business order associated with one or more operations of completing the service from the server.

* * * * *